US012651519B2

(12) United States Patent (10) Patent No.: US 12,651,519 B2
Sun et al. (45) Date of Patent: Jun. 9, 2026

(54) AMBIENT FALL DETECTION WITH MICROPHONES

(71) Applicant: Samsung Electronics Co., Ltd., Suwon-si (KR)

(72) Inventors: Wei Sun, Allen, TX (US); Aditya Dave, Plano, TX (US); Han Wang, Allen, TX (US); Hao Chen, Allen, TX (US); Russell Douglas Ford, Campbell, CA (US); Satvir S. Bhatia, Sunnyvale, CA (US); Andrea M. Small, San Francisco, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/776,194

(22) Filed: Jul. 17, 2024

(65) Prior Publication Data

US 2025/0118188 A1 Apr. 10, 2025

Related U.S. Application Data

(60) Provisional application No. 63/542,487, filed on Oct. 4, 2023.

(51) Int. Cl.
| | |
|---|---|
| *G08B 21/04* | (2006.01) |
| *G06F 3/16* | (2006.01) |
| *G10L 25/24* | (2013.01) |
| *H04R 29/00* | (2006.01) |

(52) U.S. Cl.
CPC ......... *G08B 21/0469* (2013.01); *G06F 3/167* (2013.01); *G10L 25/24* (2013.01); *H04R 29/004* (2013.01)

(58) Field of Classification Search
CPC ... G08B 21/0469; G08B 21/043; G06F 3/167; G10L 25/24; G10L 25/51; H04R 29/004
See application file for complete search history.

(56) References Cited

U.S. PATENT DOCUMENTS

| | | | |
|---|---|---|---|
| 10,309,980 B2 | 6/2019 | Fish et al. | |
| 2021/0052198 A1* | 2/2021 | Parvaneh | ............. A61B 5/1117 |
| 2024/0107254 A1 | 3/2024 | Taherian et al. | |

FOREIGN PATENT DOCUMENTS

| | | |
|---|---|---|
| CN | 115841824 A | 3/2023 |
| CN | 116942140 A | 10/2023 |
| JP | 2019079472 A | 5/2019 |
| WO | 2023240512 A1 | 12/2023 |

* cited by examiner

*Primary Examiner* — An T Nguyen

(57) ABSTRACT

An apparatus includes a microphone, a memory, and a processor operably coupled to the memory. The processor is configured to determine an energy level of an audio signal captured by the microphone and determine whether the audio signal indicates a possible fall. The processor is further configured to, upon a determination that the audio signal indicates the possible fall, poll a fall detection module.

20 Claims, 6 Drawing Sheets

100

AMBIENT FALL DETECTION WITH MICROPHONES

CROSS-REFERENCE TO RELATED APPLICATION(S) AND CLAIM OF PRIORITY

This application claims priority under 35 U.S.C. § 119 (e) to U.S. Provisional Patent Application 63/542,487 filed on Oct. 4, 2023. The above-identified provisional patent application is hereby incorporated by reference in its entirety.

TECHNICAL FIELD

This disclosure relates generally to electronic devices. More specifically, this disclosure relates to apparatuses and methods for ambient fall detection with microphones.

BACKGROUND

Aging of the population is happening rapidly in modern society, and this brings new social problems to human beings. As a result, elderly care has become a significant issue in daily life. For the elderly, fall detection is an emergent need, as falls among the elderly can have severe consequences such as injuries, hospitalizations, and loss of independence. Therefore, fall detection and alarm triggering is crucial to maintain the health of the elderly. A typical use case of fall detection is to report a fall of an elderly individual who lives alone to their relatives and first responders to respond to of fall events in a timely manner.

SUMMARY

This disclosure provides apparatuses and methods for ambient fall detection with microphones.

In one embodiment, an apparatus is provided. The apparatus includes a microphone, a memory, and a processor operably coupled to the memory. The processor is configured to determine an energy level of an audio signal captured by the microphone and determine whether the audio signal indicates a possible fall. The processor is further configured to, upon a determination that the audio signal indicates the possible fall, poll a fall detection module.

In another embodiment, a method of operating an electronic device is provided. The method includes determining an energy level of an audio signal captured by a microphone, and determining, based on the energy level of the audio signal, whether the audio signal indicates a possible fall. The method further includes, upon a determination that the audio signal indicates the possible fall, performing a fall detection operation.

In yet another embodiment, a non-transitory computer readable medium embodying a computer program is provided. The computer program includes program code that, when executed by a processor of a device, causes the device to determine an energy level of an audio signal captured by a microphone, and determine, based on the energy level of the audio signal, whether the audio signal indicates a possible fall. The computer program further includes program code that, when executed by the processor of the device, causes the device to, upon a determination that the audio signal indicates the possible fall, poll a fall detection module.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1:
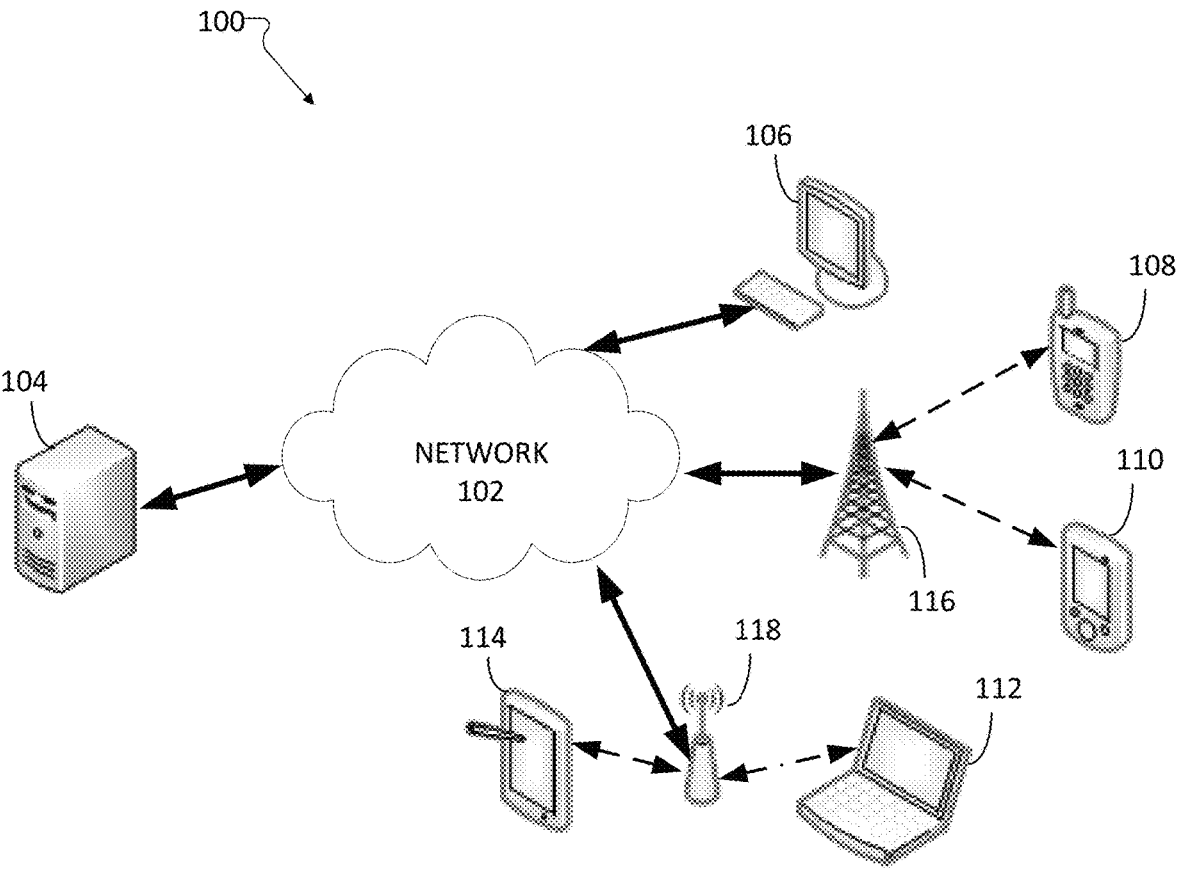
FIG. 1 illustrates an example communication system according to embodiments of the present disclosure.

FIGS. 1 through 7, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

The present disclosure covers several components which can be used in conjunction or in combination with one another or can operate as standalone schemes. Certain embodiments of the disclosure may be derived by utilizing a combination of several of the embodiments listed below. Also, it should be noted that further embodiments may be derived by utilizing a particular subset of operational steps as disclosed in each of these embodiments. This disclosure should be understood to cover all such embodiments.

Detecting falls is an important and challenging task. While there are several techniques to apply devices with accelerometers, gyroscopes and other sensors to detect a fall effectively, reports shows that the elderly are not comfortable with wearable devices. Additionally, it is common for the elderly to forget to equip these devices. Thus, ambient fall detection techniques are good fit to help the elderly non-invasively.

Popular ambient sensors including cameras, WiFi, UWB and mmWave can be applied to detect the fall. However, it is challenging to deploy such systems in real scenarios due to several limitations. First, the total cost is high. Each standalone sensor i's expensive. Multiple sensors may be implemented due to the limited coverage of one standalone sensor, which further increase the cost of the system. Additionally, the power consumption of these sensors can be significant. RF sensors in particular use more power to transmit the sensing signals actively. Such a system is not environmentally friendly and can result in increased electricity costs over the long term, which may be unaffordable particularly for elderly individuals. Finally, the accuracy of such systems is limited fundamentally as these sensors detect falls based on the motion of a human, which can be easily confused with other similar motions.

Compared to other ambient sensors, a microphone has many inherent advantages to achieve a low cost, tiny power consumption, high coverage, high accuracy and easy-to-deploy ambient fall detection system.

The present disclosure provides fall detection systems and methods based on internet of things (IoT) devices with microphones. The methods provided herein take advantage of the unique properties of acoustic signals and sensors to enable a practical ambient fall detection pipeline on IoT systems. Because a typical microphone is cheap and small, microphones have been deployed in many off-the-shelf devices including smart phones, smart watches, earbuds, smart refrigerators, smart televisions, smart speakers, etc. The methods provided herein take the audio signals sensed by a microphone and process the signals for fall detection with local process units or remote process units on edge devices. The general framework can deal with any device with microphones and leverage the functionality of other local units and remote units. Additionally, a typical microphone takes low power to sense sound passively. The methods herein further reduce the computation and power consumption by low complexity signal processing to detect an instant significant sound and trigger a fall detection algorithm on demand. Therefore, minimum power consumption is used with the ambient detection on. Finally, the sound of a fall is unique and distinguishable. The methods provided herein include a binary classification XGBoost model to recognize fall events. Additionally, the methods provided herein apply a continuous learning scheme to finetune the model by adding non-fall data into the training set from everyday activities. Thus, the model adapts itself to practical scenarios and achieves improved performance over the long term.

FIG. 1 illustrates an example communication system 100 according to embodiments of the present disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-114. The client devices 106-114 may be, for example, a smartphone (such as a UE), a tablet computer, a laptop, a personal computer, a wearable device, a head mounted display, or the like. The server 104 can represent one or more servers. Each server 104 includes any suitable computing or processing device that can provide computing services for one or more client devices, such as the client devices 106-114. Each server 104 could, for example, include one or more processing devices, one or more memories storing instructions and data, and one or more network interfaces facilitating communication over the network 102.

Each of the client devices 106-114 represent any suitable computing or processing device that interacts with at least one server (such as the server 104) or other computing device(s) over the network 102. The client devices 106-114 include a desktop computer 106, a mobile telephone or mobile device 108 (such as a smartphone), a PDA 110, a laptop computer 112, and a tablet computer 114. However, any other or additional client devices could be used in the communication system 100, such as wearable devices. Smartphones represent a class of mobile devices 108 that are handheld devices with mobile operating systems and integrated mobile broadband cellular network connections for voice, short message service (SMS), and Internet data communications. In certain embodiments, any of the client devices 106-114 can perform processes for ambient fall detection with microphones.

In this example, some client devices 108-114 communicate indirectly with the network 102. For example, the mobile device 108 and PDA 110 communicate via one or more base stations 116, such as cellular base stations or eNodeBs (eNBs) or gNodeBs (gNBs). Also, the laptop computer 112 and the tablet computer 114 communicate via one or more wireless access points 118, such as IEEE 802.11 wireless access points (APs). Note that these are for illustration only and that each of the client devices 106-114 could communicate directly with the network 102 or indirectly with the network 102 via any suitable intermediate device(s) or network(s). In certain embodiments, any of the client devices 106-114 transmit information securely and efficiently to another device, such as, for example, the server 104.

As described in more detail below, one or more of the network 102, server 104, and client devices 106-114 include circuitry, programing, or a combination thereof, to support methods for intelligent proximity systems.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
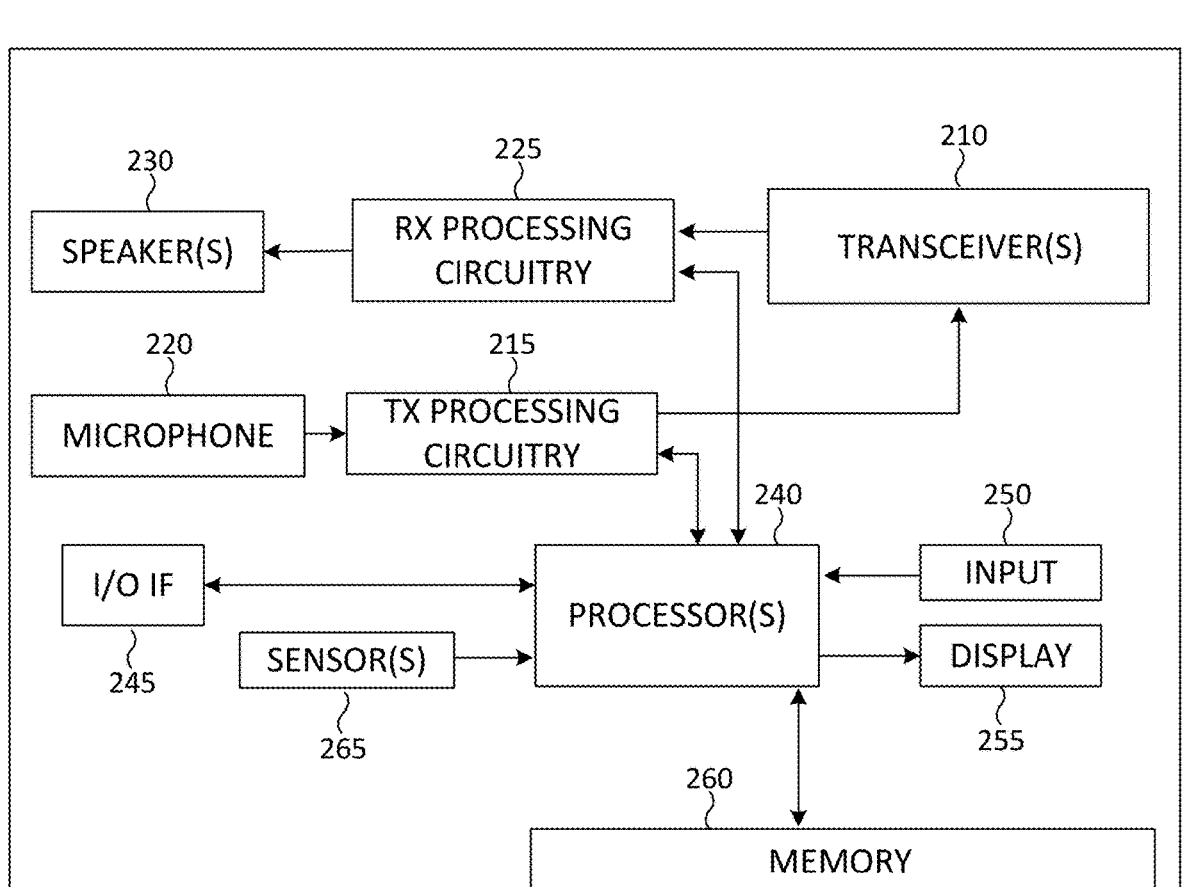
FIG. 2 illustrates an example electronic device according to embodiments of the present disclosure.

FIG. 2 illustrates an example electronic device according to embodiments of the present disclosure. In particular, FIG. 2 illustrates an example electronic device 200, and the electronic device 200 could represent the server 104 or one or more of the client devices 106-114 in FIG. 1. The electronic device 200 can be a mobile communication device, such as, for example, a UE, a mobile station, a subscriber station, a wireless terminal, a desktop computer (similar to the desktop computer 106 of FIG. 1), a portable electronic device (similar to the mobile device 108, the PDA 110, the laptop computer 112, or the tablet computer 114 of FIG. 1), a wearable device, and the like.

As shown in FIG. 2, the electronic device 200 includes transceiver(s) 210, transmit (TX) processing circuitry 215, a microphone 220, and receive (RX) processing circuitry 225. The transceiver(s) 210 can include, for example, a RF transceiver, a BLUETOOTH transceiver, a WiFi transceiver, a ZIGBEE transceiver, an infrared transceiver, an ultrasound transceiver, and various other wireless communication signals. The electronic device 200 also includes a speaker 230, a processor 240, an input/output (I/O) interface (IF) 245, an input 250, a display 255, a memory 260, and a sensor 265. The memory 260 includes an operating system (OS) 261, and one or more applications 262.

The transceiver(s) 210 can include an antenna array including numerous antennas. For example, the transceiver(s) 210 can be equipped with multiple antenna elements. There can also be one or more antenna modules fitted on the terminal where each module can have one or more antenna elements. The antennas of the antenna array can include a radiating element composed of a conductive material or a conductive pattern formed in or on a substrate. The transceiver(s) 210 transmit and receive a signal or power to or from the electronic device 200. The transceiver(s) 210 receives an incoming signal transmitted from an access point (such as a base station, WiFi router, or BLUETOOTH device) or other device of the network 102 (such as a WiFi, BLUETOOTH, cellular, 5G, LTE, LTE-A, WiMAX, or any other type of wireless network). The transceiver(s) 210 down-converts the incoming RF signal to generate an intermediate frequency or baseband signal. The intermediate frequency or baseband signal is sent to the RX processing circuitry 225 that generates a processed baseband signal by filtering, decoding, and/or digitizing the baseband or intermediate frequency signal. The RX processing circuitry 225 transmits the processed baseband signal to the speaker 230 (such as for voice data) or to the processor 240 for further processing (such as for web browsing data).

The TX processing circuitry 215 receives analog or digital voice data from the microphone 220 or other outgoing baseband data from the processor 240. The outgoing baseband data can include web data, e-mail, or interactive video game data. The TX processing circuitry 215 encodes, multiplexes, and/or digitizes the outgoing baseband data to generate a processed baseband or intermediate frequency signal. The transceiver(s) 210 receives the outgoing processed baseband or intermediate frequency signal from the TX processing circuitry 215 and up-converts the baseband or intermediate frequency signal to a signal that is transmitted.

The processor 240 can include one or more processors or other processing devices. The processor 240 can execute instructions that are stored in the memory 260, such as the OS 261 in order to control the overall operation of the electronic device 200. For example, the processor 240 could control the reception of forward channel signals and the transmission of reverse channel signals by the transceiver(s) 210, the RX processing circuitry 225, and the TX processing circuitry 215 in accordance with well-known principles. The processor 240 can include any suitable number(s) and type(s) of processors or other devices in any suitable arrangement. For example, in certain embodiments, the processor 240 includes at least one microprocessor or microcontroller. Example types of processor 240 include microprocessors, microcontrollers, digital signal processors, field programmable gate arrays, application specific integrated circuits, and discrete circuitry. In certain embodiments, the processor 240 can include a neural network.

The processor 240 is also capable of executing other processes and programs resident in the memory 260, such as operations that receive and store data, and for example, processes that support ambient fall detection with microphones. The processor 240 can move data into or out of the memory 260 as required by an executing process. In certain embodiments, the processor 240 is configured to execute the one or more applications 262 based on the OS 261 or in response to signals received from external source(s) or an operator. For example, applications 262 can include a multimedia player (such as a music player or a video player), a phone calling application, a virtual personal assistant, and the like.

The processor 240 is also coupled to the I/O interface 245 that provides the electronic device 200 with the ability to connect to other devices, such as client devices 106-114. The I/O interface 245 is the communication path between these accessories and the processor 240.

The processor 240 is also coupled to the input 250 and the display 255. The operator of the electronic device 200 can use the input 250 to enter data or inputs into the electronic device 200. The input 250 can be a keyboard, touchscreen, mouse, track ball, voice input, or other device capable of acting as a user interface to allow a user to interact with the electronic device 200. For example, the input 250 can include voice recognition processing, thereby allowing a user to input a voice command. In another example, the input 250 can include a touch panel, a (digital) pen sensor, a key, or an ultrasonic/ultrasound input device. The touch panel can recognize, for example, a touch input in at least one scheme, such as a capacitive scheme, a pressure sensitive scheme, an infrared scheme, or an ultrasonic/ultrasound scheme. The input 250 can be associated with the sensor(s) 265, a camera, and the like, which provide additional inputs to the processor 240. The input 250 can also include a control circuit. In the capacitive scheme, the input 250 can recognize touch or proximity.

The display 255 can be a liquid crystal display (LCD), light-emitting diode (LED) display, organic LED (OLED), active matrix OLED (AMOLED), or other display capable of rendering text and/or graphics, such as from websites, videos, games, images, and the like. The display 255 can be a singular display screen or multiple display screens capable of creating a stereoscopic display. In certain embodiments, the display 255 is a heads-up display (HUD).

The memory 260 is coupled to the processor 240. Part of the memory 260 could include a RAM, and another part of the memory 260 could include a Flash memory or other ROM. The memory 260 can include persistent storage (not shown) that represents any structure(s) capable of storing and facilitating retrieval of information (such as data, program code, and/or other suitable information). The memory 260 can contain one or more components or devices supporting longer-term storage of data, such as a read only memory, hard drive, Flash memory, or optical disc.

The electronic device 200 further includes one or more sensors 265 that can meter a physical quantity or detect an activation state of the electronic device 200 and convert metered or detected information into an electrical signal. For example, the sensor 265 can include one or more buttons for touch input, a camera, a gesture sensor, optical sensors, cameras, one or more inertial measurement units (IMUs), such as a gyroscope or gyro sensor, and an accelerometer. The sensor 265 can also include an air pressure sensor, a magnetic sensor or magnetometer, a grip sensor, a proximity sensor, an ambient light sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 265 can further include control circuits for controlling any of the sensors included therein. Any of these sensor(s) 265 may be located within the electronic device 200 or within a secondary device operably connected to the electronic device 200.

Although FIG. 2 illustrates one example of electronic device 200, various changes can be made to FIG. 2. For example, various components in FIG. 2 can be combined, further subdivided, or omitted and additional components can be added according to particular needs. As a particular example, the processor 240 can be divided into multiple processors, such as one or more central processing units (CPUs), one or more graphics processing units (GPUs), one or more neural networks, and the like. Also, while FIG. 2 illustrates the electronic device 200 configured as a mobile telephone, tablet, or smartphone, the electronic device 200 can be configured to operate as other types of mobile or stationary devices.

As previously described herein, the present disclosure provides fall detection systems and methods based on microphones. The methods can be applied to general IoT devices to form an audio based ambient fall detection system.

Figures 3, 4:
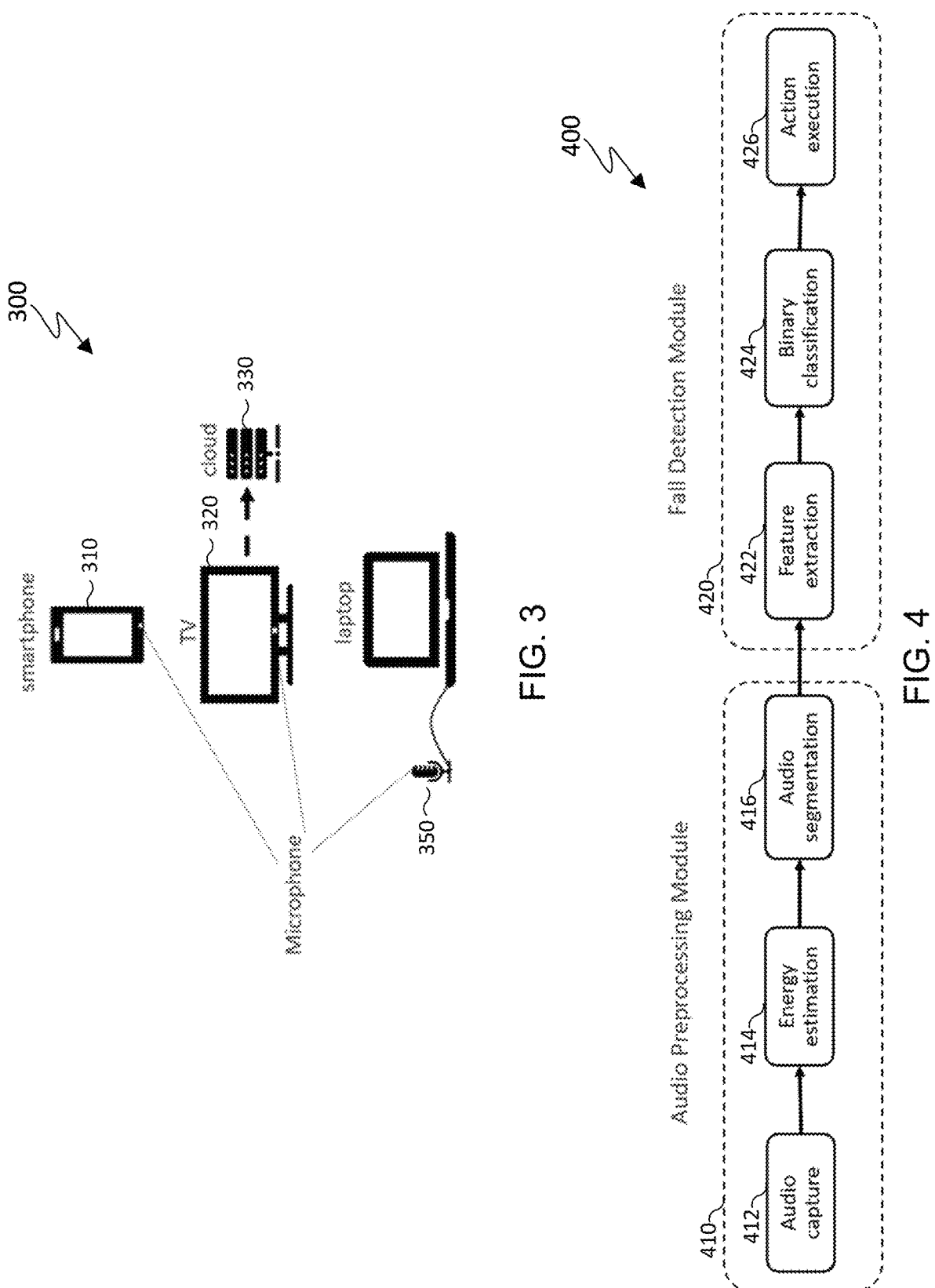
FIG. 3 illustrates an example of an ambient fall detection system according to embodiments of the present disclosure.
FIG. 4 illustrates an example processing pipeline for an ambient fall detection system according to embodiments of the present disclosure.

FIG. 3 illustrates an example of an ambient fall detection system 300 according to embodiments of the present disclosure. The embodiment of an ambient fall detection system of FIG. 3 is for illustration only. Different embodiments of an ambient fall detection system could be used without departing from the scope of this disclosure.

The example of FIG. 3 depicts three typical IoT devices that may be implemented as hardware components for an ambient fall detection system from three categories. Smartphone 310 falls within the first category. The first category includes IoT devices with both microphones and powerful local processor units such as smartphones and smart speakers. The standalone fall detection system can be deployed on such devices directly to receive audio signals and make classifications (e.g., processing pipeline 400 of FIG. 4). TV 320 falls with the second category. The second category includes IoT devices with microphones and weaker local processor units, such as smart TVs and smart refrigerators. Audio receiving and preprocessing (e.g., module 410 of processing pipeline 400 of FIG. 4) can be deployed on these devices. Then the devices can send potential audio segments to a separate device or separate apparatus such as edge servers or cloud servers such as cloud server 330 for classification (e.g., module 420 of processing pipeline 400 of FIG. 4). Laptop 340 falls within the third category. The third category includes IoT devices without a built-in microphone, such as laptops and small single board computers (e.g., a raspberry PI). An external microphone such as microphone 350 can be connected with these devices to enable reception of audio signals. Local processors can handle the input signals to distinguish whether there is a fall.

Although FIG. 3 illustrates an example of an ambient fall detection system 300, various changes may be made to FIG. 3. For example, various changes to the number of devices, the types of devices, etc. could be made according to particular needs.

FIG. 4 illustrates an example processing pipeline 400 for an ambient fall detection system according to embodiments of the present disclosure. The embodiment of a processing pipeline of FIG. 4 is for illustration only. Different embodiments of a processing pipeline for an ambient fall detection system could be used without departing from the scope of this disclosure.

In the example of FIG. 4, an ambient audio fall detection system includes a processing pipeline 400. The processing pipeline includes two modules. The first module, audio preprocessing module 410, is a lightweight audio preprocessing module configured to output a notable audio segmentation that may contain a fall. Module 410 filters out most unrelated audio segments with lightweight processing and reduces the workload of the downstream tasks. Module 410 includes an audio capture function 412, an energy estimation function 414, and an audio segmentation function 416.

The second module, fall detection module 420, is a module configured to classify an input audio segmentation from module 410 to detect a fall and trigger different policies based on the detection results. Module 420 has higher computation complexity than module 410, but module 420 is less likely to be frequently triggered. Processing pipeline 400 may be applied to various IoT devices, such as the devices described regarding FIG. 3.

Although FIG. 4 illustrates an example processing pipeline 400 for an ambient fall detection system, various changes may be made to FIG. 4. For example, various changes to the number of modules, the types of module functions, etc. could be made according to particular needs.

Figure 5:
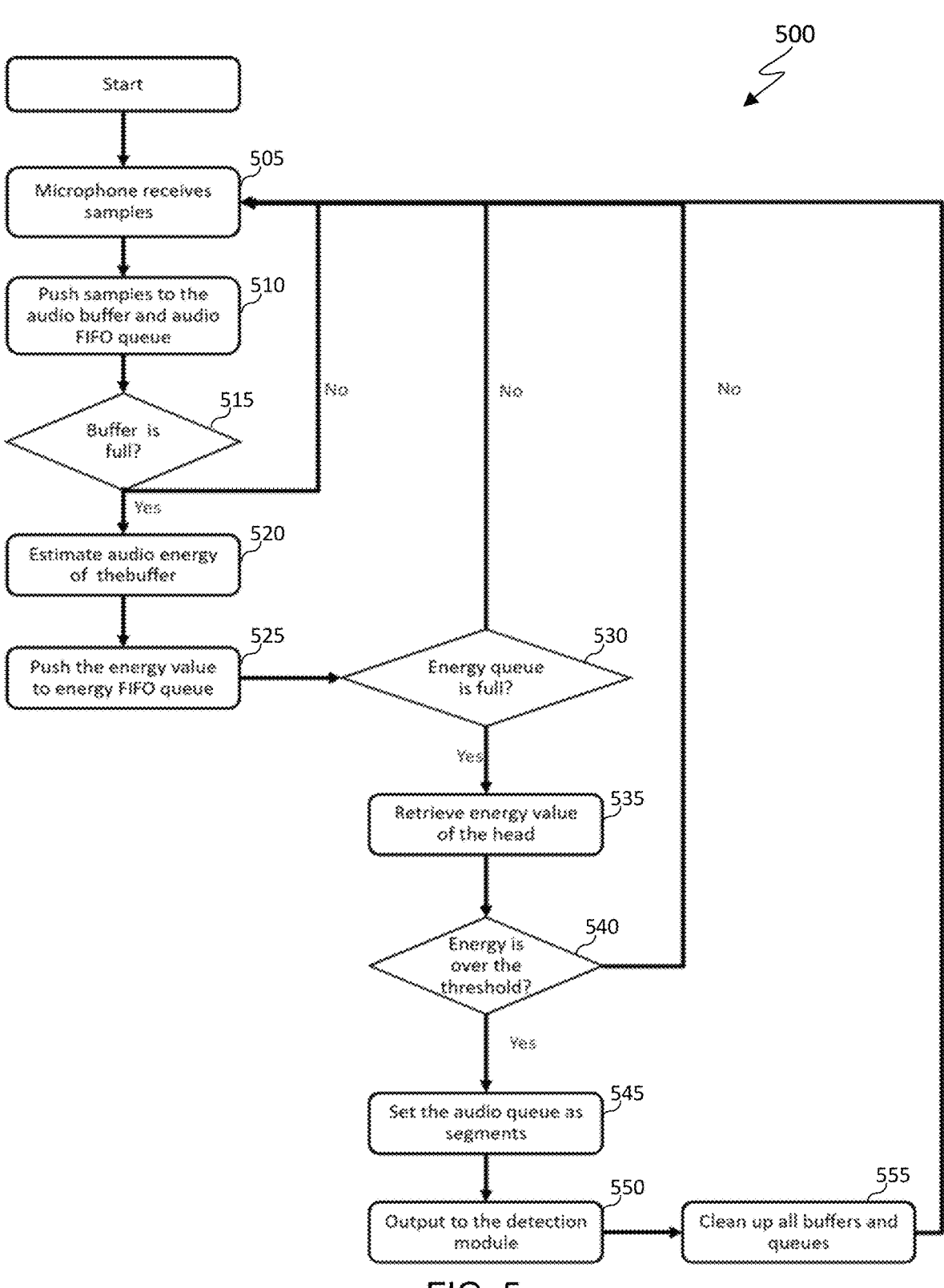
FIG. 5 illustrates an example process for an audio pre-processing module according to embodiments of the present disclosure.

FIG. 5 illustrates an example process 500 for an audio preprocessing module according to embodiments of the present disclosure. An embodiment of the process illustrated in FIG. 5 is for illustration only. One or more of the components illustrated in FIG. 5 may be implemented in specialized circuitry configured to perform the noted functions or one or more of the components may be implemented by one or more processors executing instructions to perform the noted functions. Other embodiments of a process 500 for an audio preprocessing module could be used without departing from the scope of this disclosure.

FIG. 5 illustrates an example workflow for an audio preprocessing module (e.g., audio processing module 410) in a fall detection system according to embodiments of this disclosure. The process in the example of FIG. 5 beings at step 505. At step 505, after starting the fall detection system as described herein, a microphone collects acoustic signals continuously. At step 510, the incoming audio samples are stored (i.e., pushed into) a short audio buffer and a long audio FIFO queue at the same time. The temporal size of the short audio buffer is l seconds. The audio FIFO queue $Q_L$ can be set as L seconds. When the short audio buffer is filled with audio samples (step 515), at step 520 an audio energy estimation of the instant period is applied to calculate the sound power level. At step 525, the estimated audio energy value is pushed into an energy FIFO queue $Q_P$ with a size L/2l. At step 535, the head value of the energy FIFO queue is checked when the queue achieves the maximal size (step 530). At step 540, if the head value is more than a predefined notable power level threshold, a step 545 the whole $Q_L$ is regarded as a potential audio segment for the next module, and at step 550, the segment is sent to the next module. At step 555, the short buffer, queue $Q_L$, queue $Q_P$ are all set to empty status. Otherwise, the incoming audio samples keep filling the buffer and pushing the queue $Q_L$, queue $Q_P$ while popping out early outdated values. This workflow captures the instant loud sound in l seconds. The audio preprocessing module works as a lightweight filter to capture the effective audio segmentation with a similar energy level of a fall. The process can effectively avoid frequent callbacks of a fall detection module (e.g., fall detection module 420) to optimize the overall computational complexity.

Although FIG. 5 illustrates one example of a process 500 for an audio preprocessing module, various changes may be made to FIG. 5. For example, while shown as a series of steps, various steps in FIG. 5 could overlap, occur in parallel, occur in a different order, or occur any number of times.

Figure 6:
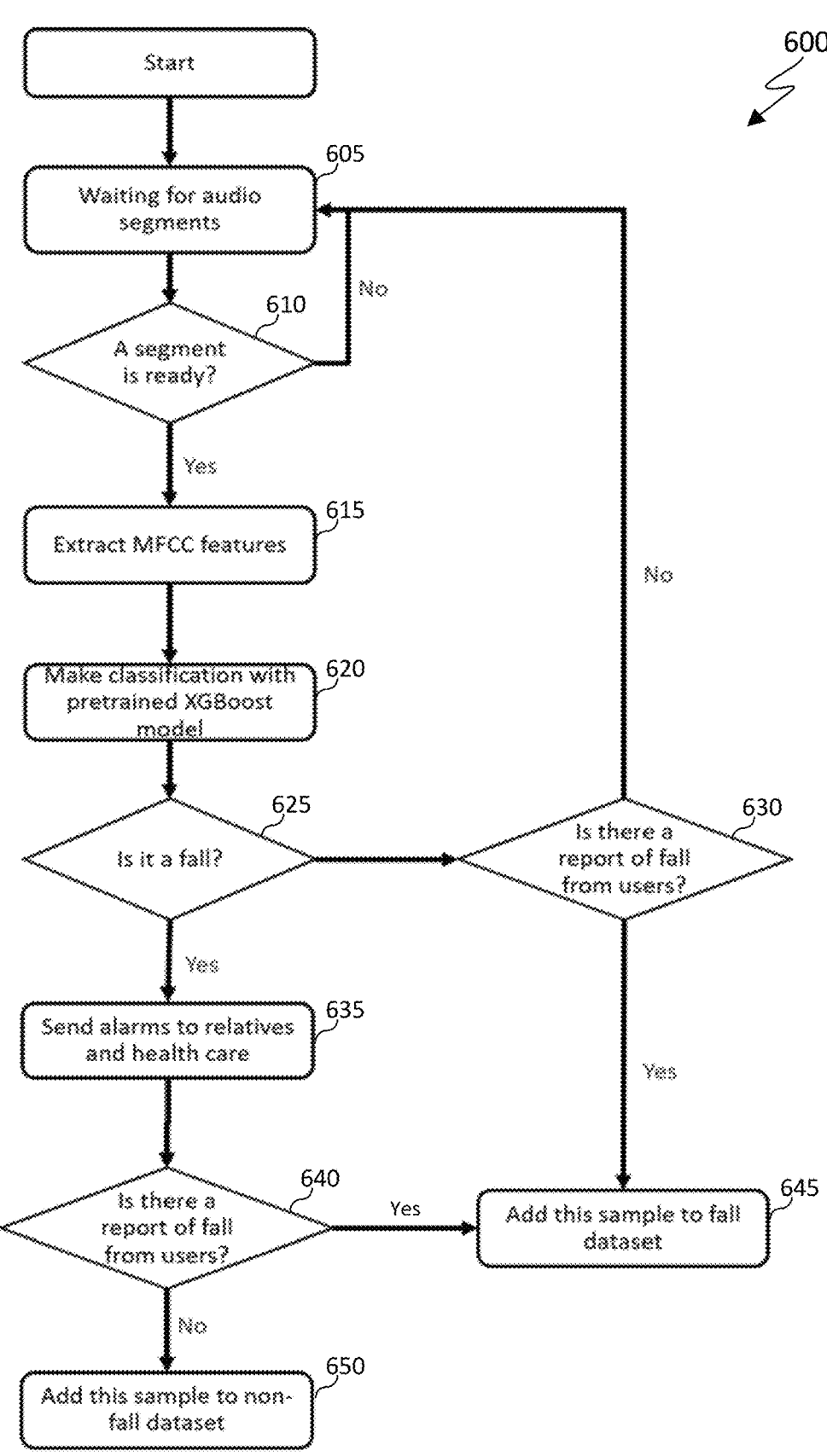
FIG. 6 illustrates an example process of model training and inference for an ambient fall detection system according to embodiments of the present disclosure.

FIG. 6 illustrates an example process 600 of model training and inference for an ambient fall detection system according to embodiments of the present disclosure. An embodiment of the process illustrated in FIG. 6 is for illustration only. One or more of the components illustrated in FIG. 6 may be implemented in specialized circuitry configured to perform the noted functions or one or more of the components may be implemented by one or more processors executing instructions to perform the noted functions. Other embodiments of a process 600 of model training and inference for an ambient fall detection system could be used without departing from the scope of this disclosure.

FIG. 6 illustrates an example workflow for model training and inference in a fall detection system according to embodiments of this disclosure. For example, the process of FIG. 6 may be performed by a fall detection module, such as fall detection module 420. The process in the example of FIG. 6 beings at step 605. At step 605, a module (e.g., fall detection module 420) waits for valid audio segments from upstream modules (e.g., audio preprocessing module 410). Upon reception of a valid audio segment (step 610), at step 615 the module performs Mel-frequency cepstral coefficients (MFCC) features extraction on the input audio segment. MFCC can amplify the spectrogram features on the low frequencies. This provides excellent feature representation for the sound of fall since most of the energy of a fall sound is distributed at low frequencies. At step 620, the features are fed into a pretrained fall detection model, e.g., a pretrained XGBoost model for fall detection. The model is trained offline with large amount of fall data and non-fall data. The process will proceed differently according to the classification result.

At step 625, if the results indicate that there is no fall, the process proceeds to step 630. At step 630, the module checks to see if a user of the fall detection system has reported a fall. If no fall has been reported, the module proceeds back to step 605, and the system waits for the new audio segments. If a fall has been reported (indicating a negative sample), the audio segment is added to a local fall training dataset at step 645 to fine tune the model.

At step 625, if the results indicate that there is high possibility to be a fall, at step 635 the fall detection system initiates a detected fall action, such as notifying relatives and health care providers to take action in response to the fall. At step 640, the module checks to see if a user of the fall detection system has confirmed there was a fall. If a fall has been confirmed (indicating a positive sample), the audio segment is added to the local fall training dataset at step 645 to fine tune the model. Otherwise, if the fall is indicated as a false alarm (a negative sample), the audio segment is added to the local non-fall training dataset at step 650 to fine tune the model.

Although FIG. 6 illustrates one example of a process 600 of model training and inference for an ambient fall detection system, various changes may be made to FIG. 6. For example, while shown as a series of steps, various steps in FIG. 6 could overlap, occur in parallel, occur in a different order, or occur any number of times.

Figure 7:
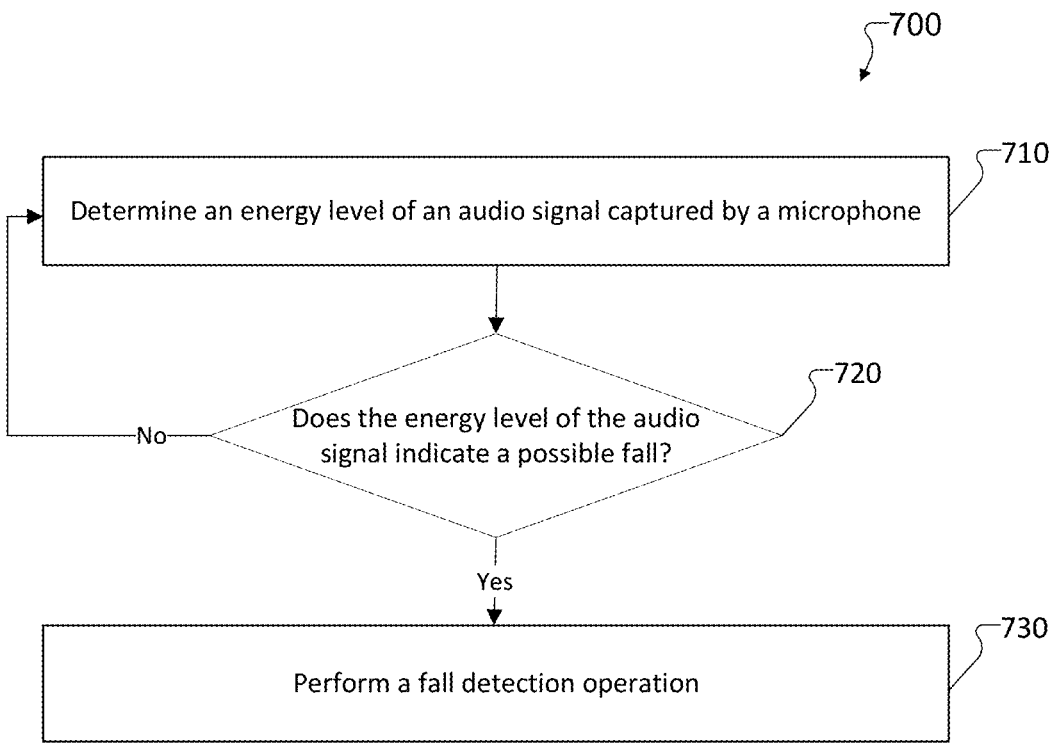
FIG. 7 illustrates a method for ambient fall detection with microphones according to embodiments of the present disclosure.

FIG. 7 illustrates a method 700 for ambient fall detection with microphones according to embodiments of the present disclosure. An embodiment of the method illustrated in FIG. 7 is for illustration only. One or more of the components illustrated in FIG. 7 may be implemented in specialized circuitry configured to perform the noted functions or one or more of the components may be implemented by one or more processors executing instructions to perform the noted functions. Other embodiments of a method 700 for ambient fall detection with microphones could be used without departing from the scope of this disclosure.

Method 700 begins at step 710. At step 710, an electronic device determines an energy level of an audio signal captured by a microphone. At step 720, the electronic devices determines, based on the energy level of the audio signal, whether the audio signal indicates a possible fall. If the energy level of the audio signal indicates a possible fall, the method proceeds to step 730. Otherwise, the method proceeds back to step 710. At step 730, the electronic device performs a fall detection operation.

Although FIG. 7 illustrates one example of method 700 for ambient fall detection with microphones, various changes may be made to FIG. 7. For example, while shown as a series of steps, various steps in FIG. 7 could overlap, occur in parallel, occur in a different order, or occur any number of times.

Any of the above variation embodiments can be utilized independently or in combination with at least one other variation embodiment. The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claim scope. The scope of patented subject matter is defined by the claims.

What is claimed is:

1. An apparatus comprising:
a microphone;
a memory; and
a processor operably coupled to the memory, the processor configured to:
   determine an energy level of an audio signal captured by the microphone during a possible fall;
   determine, based on the energy level of the audio signal, whether the audio signal indicates the possible fall; and
   upon a determination that the audio signal indicates the possible fall, poll a fall detection module.

2. The apparatus of claim 1, wherein the processor is further configured to:
store samples of the audio signal in an audio first in first out (FIFO) queue;
determine whether the audio FIFO queue is full; and
upon a determination that the audio FIFO queue is full:
   estimate an audio energy of the audio FIFO queue; and
   store the estimated audio energy in an energy FIFO queue,
wherein the energy level of the audio signal is determined based on the estimated audio energy stored in the energy FIFO queue.

3. The apparatus of claim 2, wherein the processor is further configured to:
determine whether the energy FIFO queue is full;
upon a determination that the energy FIFO queue is full, retrieve an energy value of a head of the energy FIFO queue;

determine whether the energy value of the head exceeds a threshold; and
determine whether the audio signal indicates the possible fall upon a determination that the energy value of the head exceeds the threshold.

4. The apparatus of claim 1, wherein:
to poll the fall detection module, the processor is further configured to:
   obtain an audio segment from the audio signal; and
   provide the audio segment to the fall detection module; and
the fall detection module is configured to:
   determine whether the audio segment indicates a fall; and
   upon a determination that the audio segment indicates a fall, execute a detected fall action.

5. The apparatus of claim 4, wherein the fall detection module is configured to:
extract Mel-frequency cepstral coefficients (MFCC) features from the audio segment; and
perform a classification of the MFCC features with a pretrained fall detection model,
wherein the determination whether the audio segment indicates a fall is based on a result of the classification.

6. The apparatus of claim 5, wherein the fall detection module is further configured to:
determine whether there is a report of a fall from a user;
determine, based on the result of the classification and a result of the determination whether there is a report of a fall from the user, whether the audio segment is a positive sample or a negative sample; and
add the audio segment to a dataset of the fall detection module as a positive sample or a negative sample based on a result of the determination whether the audio segment is a positive sample or a negative sample.

7. The apparatus of claim 4, wherein:
the fall detection module is comprised by a separate apparatus; and
the apparatus further comprises a transceiver operably coupled to the processor, the transceiver configured to transmit the audio segment to the separate apparatus.

8. A method of operating an electronic device, the method comprising:
determining an energy level of an audio signal captured by a microphone during a possible fall;
determining, based on the energy level of the audio signal, whether the audio signal indicates the possible fall; and
upon a determination that the audio signal indicates the possible fall, performing a fall detection operation.

9. The method of claim 8, further comprising:
storing samples of the audio signal in an audio first in first out (FIFO) queue;
determining whether the audio FIFO queue is full; and
upon a determination that the audio FIFO queue is full:
   estimating an audio energy of the audio FIFO queue; and
   storing the estimated audio energy in an energy FIFO queue,
wherein the energy level of the audio signal is determined based on the estimated audio energy stored in the energy FIFO queue.

10. The method of claim 9, further comprising:

determining whether the energy FIFO queue is full;

upon a determination that the energy FIFO queue is full, retrieving an energy value of a head of the energy FIFO queue;

determining whether the energy value of the head exceeds a threshold; and determining whether the audio signal indicates the possible fall upon a determination that the energy value of the head exceeds the threshold.

11. The method of claim 8, wherein performing the fall detection operation comprises:

obtaining an audio segment from the audio signal;

determining whether the audio segment indicates a fall; and upon a determination that the audio segment indicates a fall, executing a detected fall action.

12. The method of claim 11, further comprising:

extracting Mel-frequency cepstral coefficients (MFCC) features from the audio segment; and performing a classification of the MFCC features with a pretrained fall detection model, wherein determining whether the audio segment indicates a fall is based on a result of the classification.

13. The method of claim 12, further comprising:

determining whether there is a report of a fall from a user;

determining, based on the result of the classification and a result of the determination whether there is a report of a fall from the user, whether the audio segment is a positive sample or a negative sample; and adding the audio segment to a dataset as a positive sample or a negative sample based on a result of the determination whether the audio segment is a positive sample or a negative sample.

14. A non-transitory computer readable medium embodying a computer program, the computer program comprising program code that, when executed by a processor of a device, causes the device to:

determine an energy level of an audio signal captured by a microphone during a possible fall;

determine, based on the energy level of the audio signal, whether the audio signal indicates the possible fall; and upon a determination that the audio signal indicates the possible fall, poll a fall detection module.

15. The non-transitory computer readable medium of claim 14, wherein the computer program further comprises computer readable program code that, when executed by the processor, causes the device to:

store samples of the audio signal in an audio first in first out (FIFO) queue;

determine whether the audio FIFO queue is full; and upon a determination that the audio FIFO queue is full:

estimate an audio energy of the audio FIFO queue; and store the estimated audio energy in an energy FIFO queue, wherein the energy level of the audio signal is determined based on the estimated audio energy stored in the energy FIFO queue.

16. The non-transitory computer readable medium of claim 15, wherein the computer program further comprises computer readable program code that, when executed by the processor, causes the device to:

determine whether the energy FIFO queue is full;

upon a determination that the energy FIFO queue is full, retrieve an energy value of a head of the energy FIFO queue;

determine whether the energy value of the head exceeds a threshold; and determine whether the audio signal indicates the possible fall upon a determination that the energy value of the head exceeds the threshold.

17. The non-transitory computer readable medium of claim 14, wherein:

to poll the fall detection module, the computer program further comprises computer readable program code that, when executed by the processor, causes the device to:

obtain an audio segment from the audio signal; and determine whether the audio segment indicates a fall; and the fall detection module is configured to:

determine whether the audio segment indicates a fall; and upon a determination that the audio segment indicates a fall, execute a detected fall action.

18. The non-transitory computer readable medium of claim 17, wherein the fall detection module is configured to:

extract Mel-frequency cepstral coefficients (MFCC) features from the audio segment; and perform a classification of the MFCC features with a pretrained fall detection model, wherein the determination whether the audio segment indicates a fall is based on a result of the classification.

19. The non-transitory computer readable medium of claim 18, wherein the fall detection module is further configured to:

determine whether there is a report of a fall from a user;

determine, based on the result of the classification and a result of the determination whether there is a report of a fall from the user, whether the audio segment is a positive sample or a negative sample; and add the audio segment to a dataset of the fall detection module as a positive sample or a negative sample based on a result of the determination whether the audio segment is a positive sample or a negative sample.

20. The non-transitory computer readable medium of claim 17, wherein:

the fall detection module is comprised by a separate device; and the computer program further comprises computer readable program code that, when executed by the processor, causes the device to transmit the audio segment to the separate device.

\* \* \* \* \*